US010268005B2

(12) United States Patent
Lee et al.

(10) Patent No.: US 10,268,005 B2
(45) Date of Patent: Apr. 23, 2019

(54) METHOD FOR MANUFACTURING ACTIVE OPTICAL CABLE

(71) Applicant: AQUAOPTICS CORP., Zhubei, Hsinchu County (TW)

(72) Inventors: Tung-An Lee, Zhubei (TW); Shih-Jye Yo, Zhubei (TW); Chia-Chi Chang, Taipei (TW)

(73) Assignee: AQUAOPTICS CORP., Zhubei (TW)

(*) Notice: Subject to any disclaimer, the term of this patent is extended or adjusted under 35 U.S.C. 154(b) by 123 days.

(21) Appl. No.: 15/412,062

(22) Filed: Jan. 23, 2017

(65) Prior Publication Data

US 2018/0164516 A1 Jun. 14, 2018

(30) Foreign Application Priority Data

Dec. 13, 2016 (TW) .............................. 105141217 A

(51) Int. Cl.
*G02B 6/42* (2006.01)
*G02B 6/32* (2006.01)
*G02B 6/44* (2006.01)

(52) U.S. Cl.
CPC ............ *G02B 6/4227* (2013.01); *G02B 6/32* (2013.01); *G02B 6/428* (2013.01); *G02B 6/4214* (2013.01); *G02B 6/4224* (2013.01); *G02B 6/4239* (2013.01); *G02B 6/4246* (2013.01); *G02B 6/4249* (2013.01); *G02B 6/4253* (2013.01); *G02B 6/4255* (2013.01); *G02B 6/4284* (2013.01); *G02B 6/4292* (2013.01); *G02B 6/4416* (2013.01)

(58) Field of Classification Search
None
See application file for complete search history.

(56) References Cited

U.S. PATENT DOCUMENTS

| | | | | |
|---|---|---|---|---|
| 6,504,107 | B1* | 1/2003 | Kragl .................. | G02B 6/4214 174/260 |
| 7,572,071 | B1* | 8/2009 | Wu ...................... | G02B 6/3817 385/101 |
| 2012/0076454 | A1* | 3/2012 | Shiraishi .................. | G02B 6/42 385/14 |
| 2012/0251036 | A1* | 10/2012 | Inoue ..................... | G02B 6/122 385/14 |
| 2013/0148978 | A1* | 6/2013 | Miao ..................... | G02B 6/4292 398/139 |
| 2013/0259419 | A1* | 10/2013 | Charbonneau-Lefort ................... G02B 6/4214 385/14 |
| 2013/0315528 | A1* | 11/2013 | Levy ..................... | G02B 6/425 385/14 |
| 2014/0227908 | A1* | 8/2014 | Satoh ................... | H01R 13/516 439/620.15 |

(Continued)

*Primary Examiner* — Chad H Smith
(74) *Attorney, Agent, or Firm* — Chih Feng Yeh; Huntington IP Consulting Co., Ltd.

(57) ABSTRACT

A method for manufacturing an active optical cable comprises (a) flip-chip packaging chips onto a circuit board to form a OE circuit board, (b) integrating the OE circuit board onto an optical bench to form a OE bench, (c) integrating the OE bench onto a printed circuit board to form a OE module, (d) molding encapsulant onto the OE bench, (e) coupling a hybrid cable onto the OE module, and (f) utilizing low temperature, low pressure injection molding process to form the active optical cable.

20 Claims, 9 Drawing Sheets

(56) References Cited

U.S. PATENT DOCUMENTS

2015/0309269 A1* 10/2015 Daikuhara ........... G02B 6/4281
                                                          385/14
2015/0316734 A1* 11/2015 Chang .................. G02B 6/4201
                                                          385/14
2015/0331206 A1* 11/2015 Dutta ................. G02B 6/12002
                                                          385/14

* cited by examiner

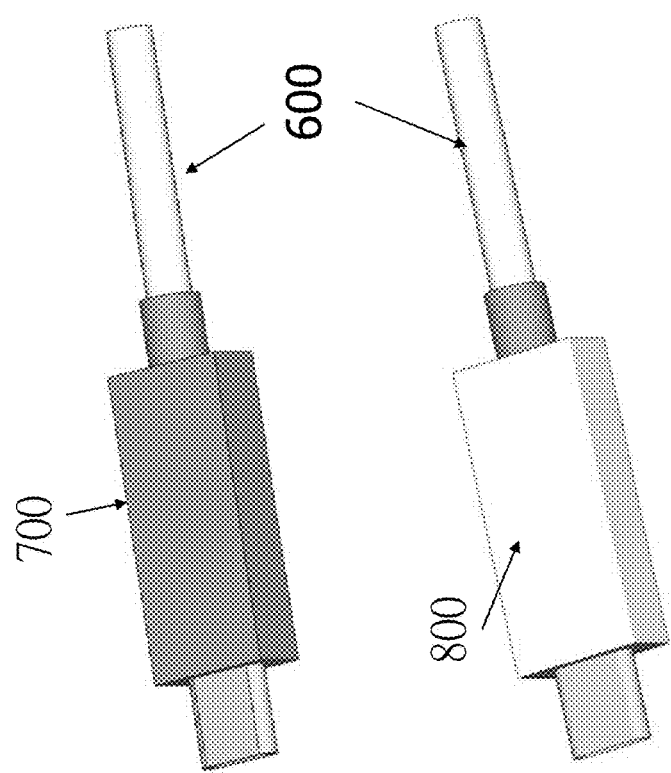

METHOD FOR MANUFACTURING ACTIVE OPTICAL CABLE

REFERENCE TO RELATED APPLICATIONS

The application is a counterpart foreign application of TAIWAN Patent Application Serial Number 105141217, filed on Dec. 13, 2016, which is herein incorporated by reference in its entirety.

TECHNICAL FIELD

The present invention relates to a photoelectric device, and more particularly, to a method for manufacturing an active optical cable which provides signal transmission and conversion between optical devices and electrical devices.

RELATED ARTS

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Some types of optical fiber connectors are active systems, which are referred to as active optical cable (AOC) in this technical field. By utilizing AOC, optical fiber embedded in the optical cable is connected to active optical components, such as transceiver (such as transmitter and receiver device, or electro-optical converter) of the AOC. AOC usually uses an electrical connector that is configured to connect to an electrical device or cable. AOC is used to interconnect computers, servers, routers, mass storage devices, computer chips, and similar data devices, and is often used in telecommunication networks.

Consequently, optical technology plays a significant role in modern electronic devices, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

The use of the optical fibers requires photoelectric conversion modules to convert electrical signals to optical signals, or optical signals to electrical signals. Also, the photoelectric conversion modules are attached to be fixed to ends of the optical fibers, or to be attachable to or detachable from ends of the optical fibers.

For opto-electronic cable, the injection molding is not applied for sealing protection. The main reason is that most of the photoelectric module packaging is adapted by using chip on board (COB) packaging, and the reasons which does not apply to the injection molding are described as following: (1) the light source chip (LD) and the light receiving element (PD) and control IC are using COB type for attaching on printed circuit board (PCB), and LD/PD and control IC connected to printed circuit board by metal wire; then, optically coupled device (connector body) covers the photoelectric chip and attached on the printed circuit board. In order to maintain the focal length between the lens array and LD/PD in the optically coupled device and avoid touching the metal wire, backside of the optically coupled device must have enough space height, and the height is usually not less than 300 microns ($\mu m$). Thus, encapsulant material is very easy to pour into the space and damage to photoelectric chip and metal wire; (2) mirror of the optically coupled device is designed to guide optical signals for non-coplanar turning and effectively guide external optical signal, differences of refractive index between the optically coupled device and the external air creates a total reflection effect. Therefore, in encapsulating operation, it must avoid the encapsulant material pouring into the mirror space. As the encapsulant material enters into the mirror space, the total reflection effect will be lost. It can use adhesive tape or protective cover to protect, but molding pressure is usually too large, easy to make the encapsulant material enter into the mirror (because large pressure difference); (3) injection molding pressure is generally set at 350~1300 bar, and the injection temperature will reach over 200 degrees C. The optically coupled device is prone to be damaged under such injection pressure, and its temperature resistance is usually not more than 200 degrees C. Therefore, temperature of the general injection molding is over 200 degrees C., easy to cause deformation of the optically coupled device due to high temperature.

In the aforementioned operating mechanism of the photoelectric conversion module, as the light source chip and the light receiving element can successfully communicate the optical signal between the photoelectric conversion module and an external device, the light source chip and the light receiving element need to align with their below lens array. However, for generally aligning manner of chip on board (COB) package, because the distance between the light source chip, the light receiving element and the lens array is too long (e.g., greater than 300 micrometers ($\mu m$)) for more difficult alignment. Therefore, as aligning for package, the light source chip and the light receiving element are driven for exciting light and receiving optical signal respectively, the packaging position is determined by measuring change of the optical signal intensity during packaging alignment to achieve the optical alignment requirement. Therefore, based-on this packaging alignment mechanism, package time of the photoelectric conversion module is longer than that of mass production.

In view of the disadvantages of the above prior arts technology, the invention provides a new method for manufacturing an active optical cable to overcome the disadvantages.

SUMMARY

In this invention, a method for manufacturing an active optical cable is proposed. The method comprises flip-chip packaging a chip on a circuit board to form an optoelectronic circuit board. The optoelectronic circuit board is configured on an optical bench to form an optoelectronic bench. The optoelectronic bench is configured on a printed circuit board to form an optoelectronic module. The optoelectronic module is encapsulated by an encapsulant. Optical fibers or an opto-electric cable is engaged with the optoelectronic module to form a photoelectric conversion assembly. Low pressure, low temperature injection molding process is performed to form the active optical cable.

The photoelectric conversion module comprises the circuit board having conductive trace formed on the circuit board; at least one optical element flip-chip configuring on the circuit board to couple to the conductive trace of the circuit board; and the optical bench having a first configuration region for supporting the printed circuit board and a second configuration region for supporting the circuit board; wherein the optical bench includes at least one lens array and a mirror, wherein one of the at least one lens array is configured to align the at least one optical element.

According to one aspect of the invention, the circuit board is attached on the second configuration region of the optical bench by using an adhesive material. The at least one lens array includes a first lens array and a second lens array formed on the optical bench. The arrangement orientation of the first lens array is the same as the second lens array. The at least one optical element is a light source chip, a photo diode chip, a photo detector chip or a photosensitive chip.

According to another aspect of the invention, the hybrid cable is composed of optical fibers and electrical wires, wherein the optical fibers are coupled to the optoelectronic module and electrical wires are coupled to the printed circuit board.

According to yet another aspect of the invention, the method further comprises providing an optical connector to engage with the optical bench and the optical fibers. A guide pin is used for engaging the optical connector and the optical bench.

A size of the circuit board is less than or equal to that of the second configuration region of the optical bench.

The method further comprises optoelectronic bench coupling to the printed circuit board by flip-chip packaging. The method further comprises configuring at least one IC on the circuit board. The at least one IC is a driver integrated circuit (IC), a control IC or a trans-impedance amplifier (TIA) chip. The circuit board has at least one through hole passing through a top surface to a bottom surface of the circuit board, which is used for aligning to alignment mark on the optical bench. The printed circuit board has at least one through hole passing through a top surface to a bottom surface of the printed circuit board, which is used for aligning to alignment mark on the optical bench. At least one IC or at least one passive component (such as resistor, capacitor, inductor) is configured on the circuit board. The optical bench has a concave portion for receiving at least one optical element on the circuit board. The optical bench is attached on the printed circuit board by using an adhesive material.

According to an aspect of the invention, the optoelectronic bench is coupled to the printed circuit board by wire bonding or flip board mounting.

BRIEF DESCRIPTION OF THE DRAWINGS

The components, characteristics and advantages of the present invention may be understood by the detailed descriptions of the preferred embodiments outlined in the specification and the drawings attached:

FIG. 9 illustrates a perspective view showing a plastic injection molding to encapsulate the OE module according to one embodiment of the invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
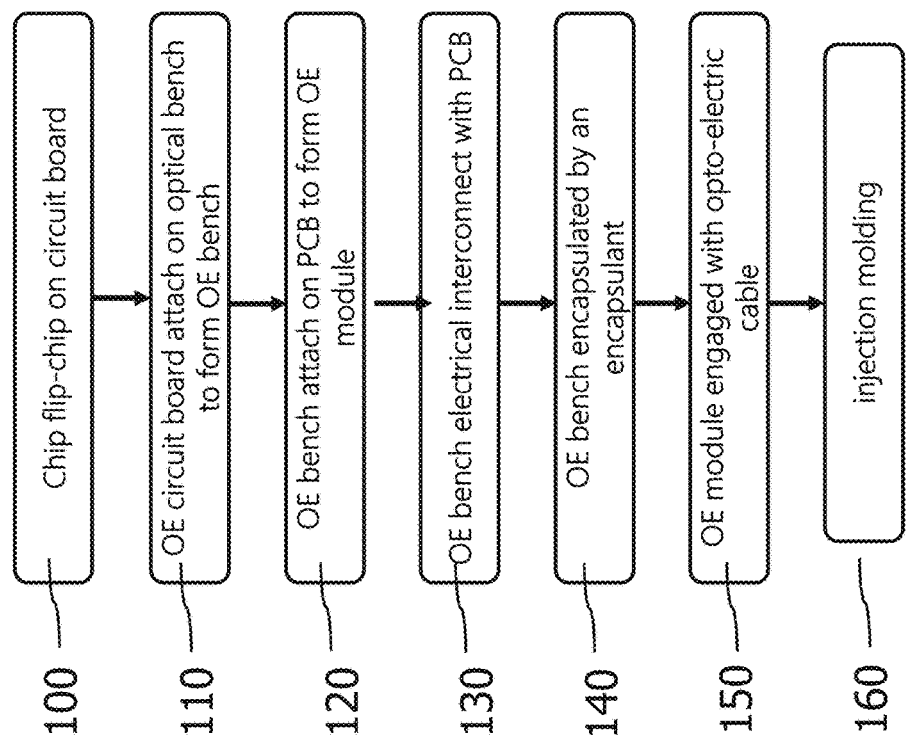
FIG. 1 illustrates a process flow chart of a method for manufacturing an active optical cable (AOC) according to an embodiment of the invention.

FIG. 1 illustrates a process flow chart of a method for manufacturing an active optical cable (AOC) according to an embodiment of the invention. For example, the active optical cable may include a photoelectric composite cable (hybrid cable) or an optical fiber, a first photoelectric conversion assembly and a second photoelectric conversion assembly configured two ends of the active optical cable. The active optical cable may be used for unidirectional transmission or bidirectional transmission. The active optical cable may be applied to a high speed transmission interface, such as USB (Universal Serial Bus), HDMI (High Definition Multimedia Interface), Lighting or Thunderbolt interface, for cable consumer products, or applied to a transmission interface, such as storage BUS including Fiber Channel (FC), SAS (Serial Attached SCSI), PCIe (PCI Express) or SATA (Serial Advanced Technology Attachment), for photoelectric products or equipment. In one embodiment, the active optical cable is used for an electrical connection between digital video devices or apparatus. In one embodiment, the first photoelectric conversion assembly may be as an optical transmitter and the second photoelectric conversion assembly may be as an optical receiver, for unidirectional transmission. In another embodiment, the first photoelectric conversion assembly may be as an optical transceiver and the second photoelectric conversion assembly may be as an optical transceiver, for bidirectional transmission. For example, in various applications, the active optical cable may be used for photoelectric composite cable (hybrid cable) or optical fiber. The photoelectric composite cable (hybrid cable) is composed of optical fibers and electrical wires.

Figure 2:
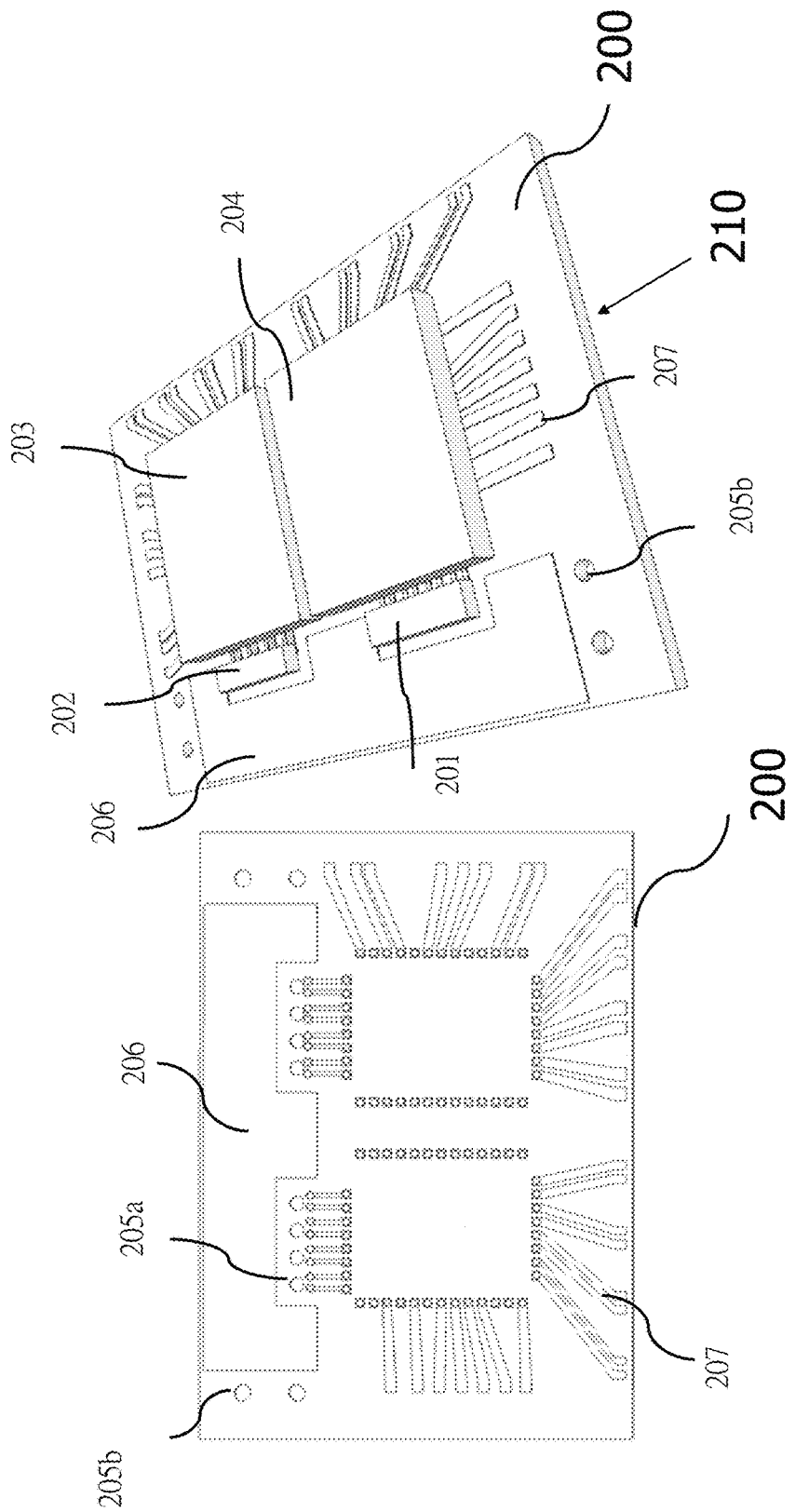
FIG. 2 illustrates a perspective view showing chips configured on the circuit board by a flip-chip packaging process according to an embodiment of the invention.

The method for manufacturing an active optical cable (AOC) comprises a step 100, flip-chip packaging (mounting) chip on a circuit board to form an optoelectronic (OE) circuit board. In the step 100, the chips include optical chip, for example a light source chip (such as laser diode, LED, Vertical-Cavity Surface-Emitting Laser (VCSEL)) 201 and a light receiving element (or a photo detector chip) 202, and a driver IC 204 and a control IC 203. The chips are configured on the circuit board 200 by a flip-chip packaging process, as shown in FIG. 2. In one embodiment, the light source chip 201 is configured on the circuit board 200. In one embodiment, the light receiving element 202 is configured on the circuit board 200. In one embodiment, the driver integrated circuit (IC) 204, the control IC 203 or a trans-impedance amplifier (TIA) chip, or others active components, may be configured on the circuit board 200. In one embodiment, at least one passive component (such as resistor, capacitor, inductor) may be configured on the circuit board 200. In one embodiment, at least one IC or at least one passive component (such as resistor, capacitor, inductor) may be configured on the circuit board 200. In one embodiment, conductive trace 207 may be formed (configured) on the circuit board 200. The conductive trace 207, for example metal trace, may be designed to configure on the periphery of the configuration area of the chips, and formed by an identical process of manufacturing. The light source chip 201, the light receiving element 202, the control IC 203 and the driver IC 204 are packaged on the circuit board 200 by a flip-chip packaging process. The conductive trace 207 on the circuit board 200 is electrically connected to the external circuit (bonding pads on printed circuit board), by wire bonding electrically connecting or directly electrically connecting (such as flip-chip packaging). Portion of the conductive trace 207 is electrically connecting with the light source chip 201 and the driver IC 204, other portion of the conductive trace 207 is electrically connecting with the light receiving element 202 and the control IC 203. Material of the circuit board 200 comprises silicon, silica, ceramic, or dielectric material, or the circuit board 200 is flexible print circuit (FPC) as a substrate.

The above-mentioned chips are packaged on the circuit board 200 to form an OE circuit board 210. In addition to the conductive trace 207 formed on the OE circuit board 210, the OE circuit board 210 is provided with a sheet of heat dissipation region 206 arranged around the chips so as to quickly dissipating the heat generated by the chips away from the area of the chips. The heat dissipation (metal) region 206 may be designed as different pattern to create a more effective mechanism of heat dissipation. The circuit board 200 is made with a plural of perforations (via holes). The via holes 205a located under the light source chip 201 or the light receiving element 202 may be as optical signal channel which makes the optical signal passing through the circuit board 200. However, whether the via holes 205a of optical signal channel is fabricated or not depends on the wavelength of optical signal and the material of the circuit board. The others via holes 205b are provided for detection and alignment, which will be described in the next step. The heat dissipation (metal) region 206, the metal trace 207 and the via holes 205a, 205b can be manufactured by semiconductor manufacturing processes. The metal region 206 and the metal trace 207 can be formed by an identical process.

Figure 3:
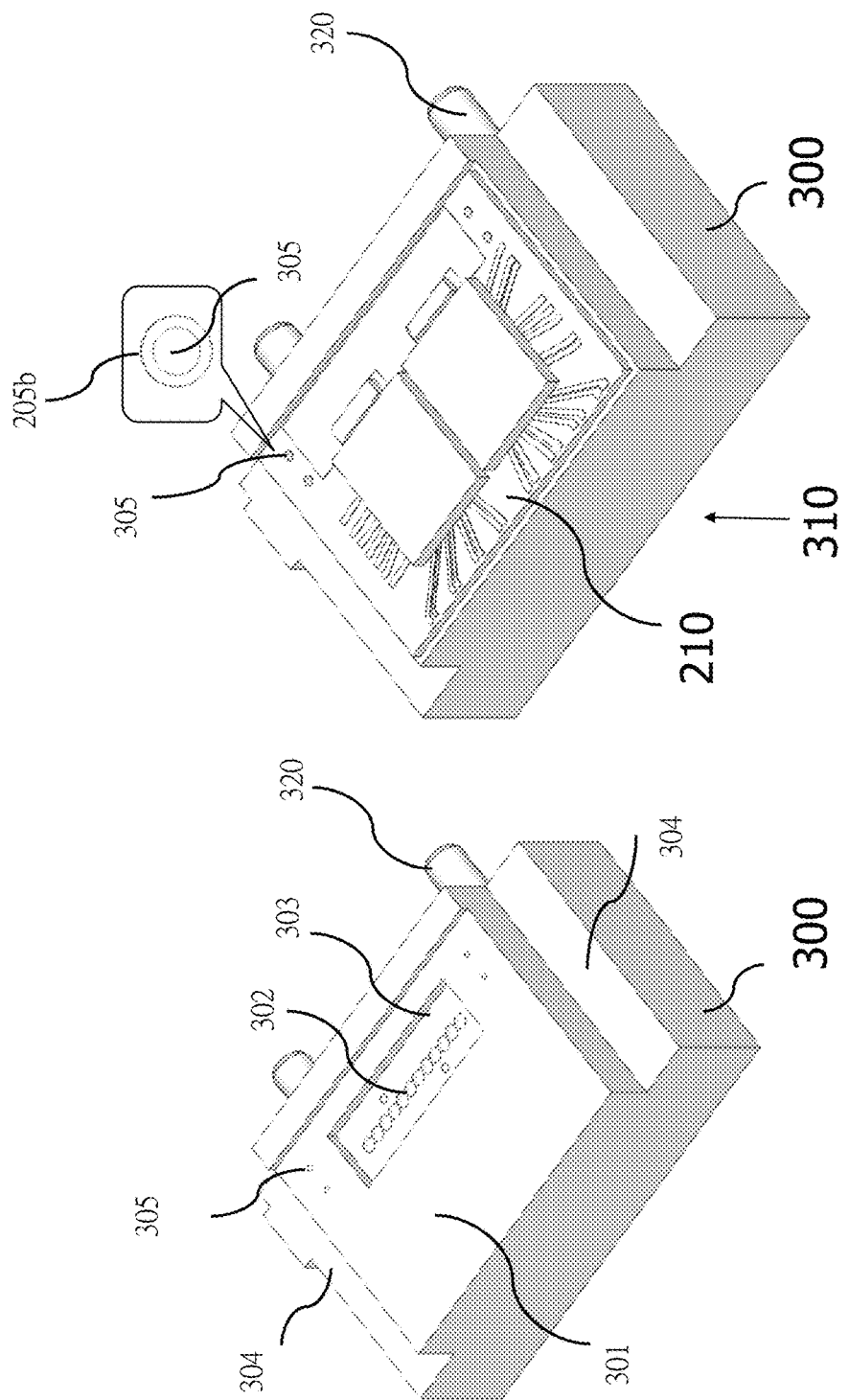
FIG. 3 is a perspective view showing OE circuit board integrated with an optical bench according to an embodiment of the invention.

Subsequently, in the step 110, the OE circuit board is integrated with an optical bench, shown in FIG. 3. In the step 110, the OE circuit board 210 is configured on the optical bench 300 to form an optoelectronic (OE) bench 310. The optical bench 300 is designed to have a platform region 301 for the OE circuit board 210 formed thereon. In one embodiment, the OE circuit board 210 is attached onto the optical bench 300 by an adhesive material, such as glue material. In one embodiment, the optical bench 300 can be fabricated by an injection molding process, for example a plastic injection molding process, to form the platform region (configuration region) 301, lens array 302. The platform region (configuration region) 301 is used for supporting the OE circuit board 210. In one embodiment, the platform region (configuration region) 301 is provided with a concave portion 303 for the lens array 302 located therein. The lens array 302 is used to focus, collimate or guide light. The lens array 302 can be used to enhance the efficiency of optical usage and to increase the allowable value of the package of optical components. The platform region (configuration region) 301 is provided with an identification or check mark 305 for packaging. The mark 305 has convex or concave shape. The mark 305 corresponds to via hole 205b on the OE circuit board 210, and diameter of the mark 305 is smaller than that of the via hole 205b. Therefore, in packaging process or package finished, the package error may be controlled or checked by checking whether the mark locates within the via hole or not, as shown in FIG. 3.

Figure 4:
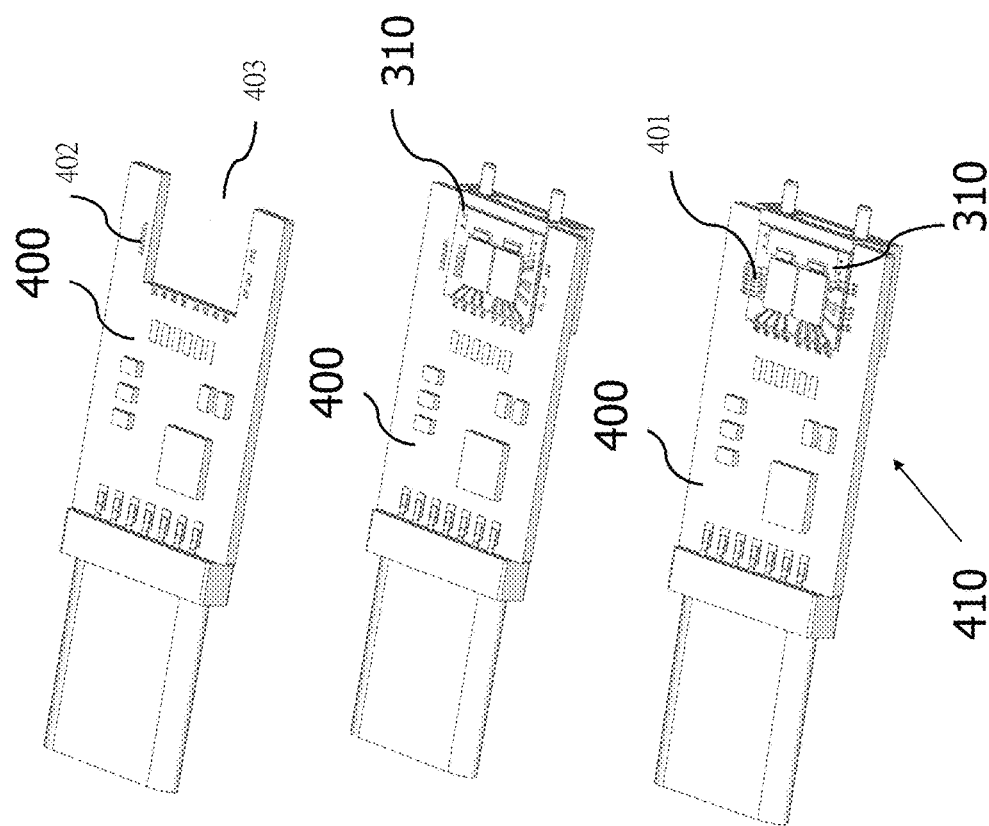
FIG. 4 illustrates OE bench disposed on a printed circuit board according to one embodiment of the invention.
Figure 5:
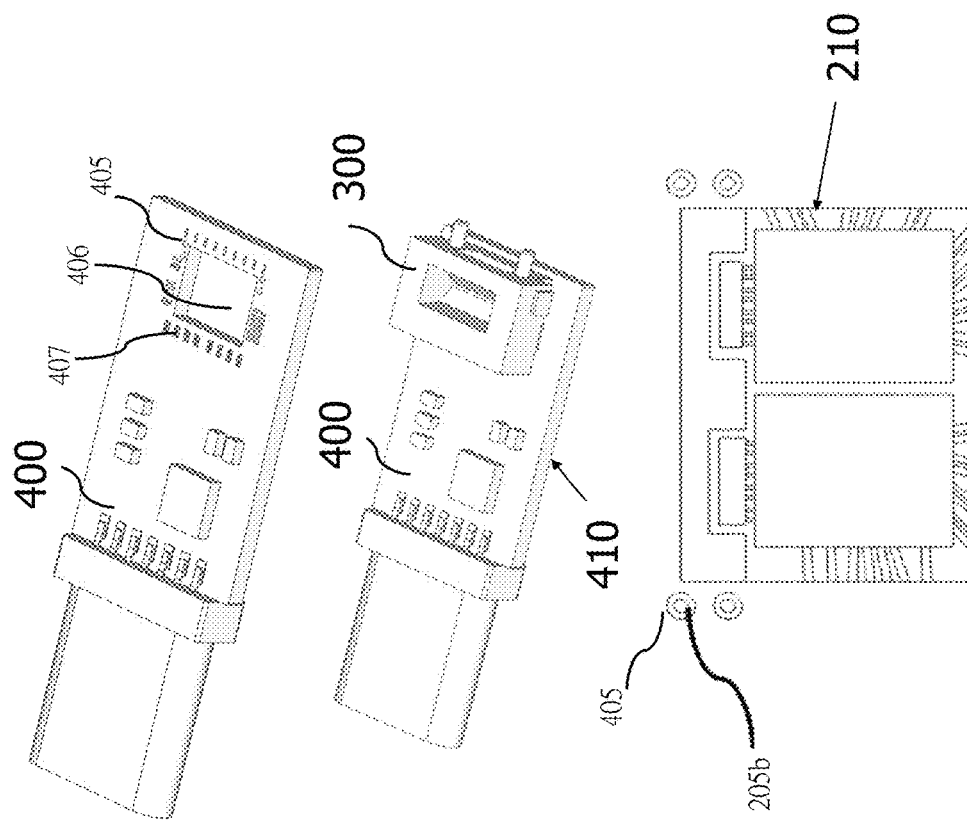
FIG. 5 illustrates a schematic perspective view showing OE circuit board directly metal pressing to the circuits of the printed circuit board according to an embodiment of the invention.

Then, in the step 120, the OE bench 310 is disposed on a printed circuit board 400, as shown in FIG. 4. In the step 120, the OE bench 310 is integrated with the printed circuit board to form an OE module 410. Next, in the step 130, the OE bench 310 is electrically connected with the printed circuit board 400. Based-on the electrical connection type between the OE circuit board 210 and the external circuits, the electrical connection type of the OE bench 310 and the printed circuit board 400 includes two types, wire bonding and metal bump bonding. In the wire bonding method, the optical bench 300 has a placement area (lower platform) 304 on both sides thereof, to provide a printed circuit board 400 disposed thereon. For example, the placement area 304 of the OE bench 310 is attached on U-shaped region 403 of the printed circuit board 400 by an adhesive material (e.g., colloid). The OE circuit board 210 is electrically connected with bonding pad 402 of the printed circuit board 400 by metal wire bonding 401 to form an OE module 410, for electrically connected with the external application circuits, as shown in FIG. 4. In the metal bump bonding method, by flip board mounting, the chips on the OE circuit board 210 facing to the opening 406 of the printed circuit board 400, the external connection metal lines (metal trace 207) of the OE circuit board 210 is directly metal pressing to the circuits 407 of the printed circuit board 400 to form an OE module (flip-chip assembly) 410, as shown in FIG. 5. The printed circuit board 400 is performed by a drilling process to form an opening 406 for accommodating the active components, to avoid between the light source chip 201, the light receiving element 202, ICs 203/204 and the circuit board 200 creating a spatial interference. Via holes 405 are formed around the opening 406, for facilitating to observe the convex or concave mark 305 of the optical bench 300. Diameter of the mark 305 is smaller than that of the via hole 405. That is, when the OE bench 310 is integrated with the printed circuit board 400 to form the OE module 410, the via hole 405 is aligned with the via hole 205b and the mark 305.

Figure 6:
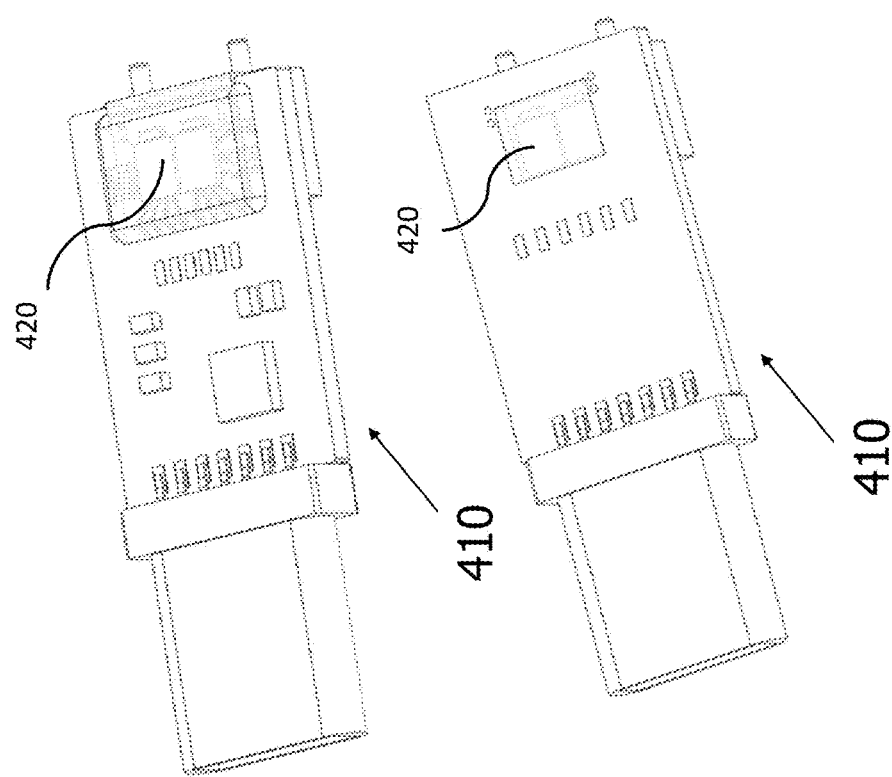
FIG. 6 illustrates a top view showing packaging an encapsulant on OE bench according to an embodiment of the invention.

Subsequently, in the step 140, the OE bench 310 is encapsulated by an encapsulant. In order to protect the OE bench 310 of the OE module 410, an encapsulant 420 is packaged for sealing the top surface of the bottom surface of the OE bench 310 to protect the OE bench 310 from damage, as shown in FIG. 6. The encapsulant 420 is provided with a protection for the OE bench 310 and a good thermal dissipation (heat conduction path) for conducting thermal of the OE bench 310 outside.

Figure 7:
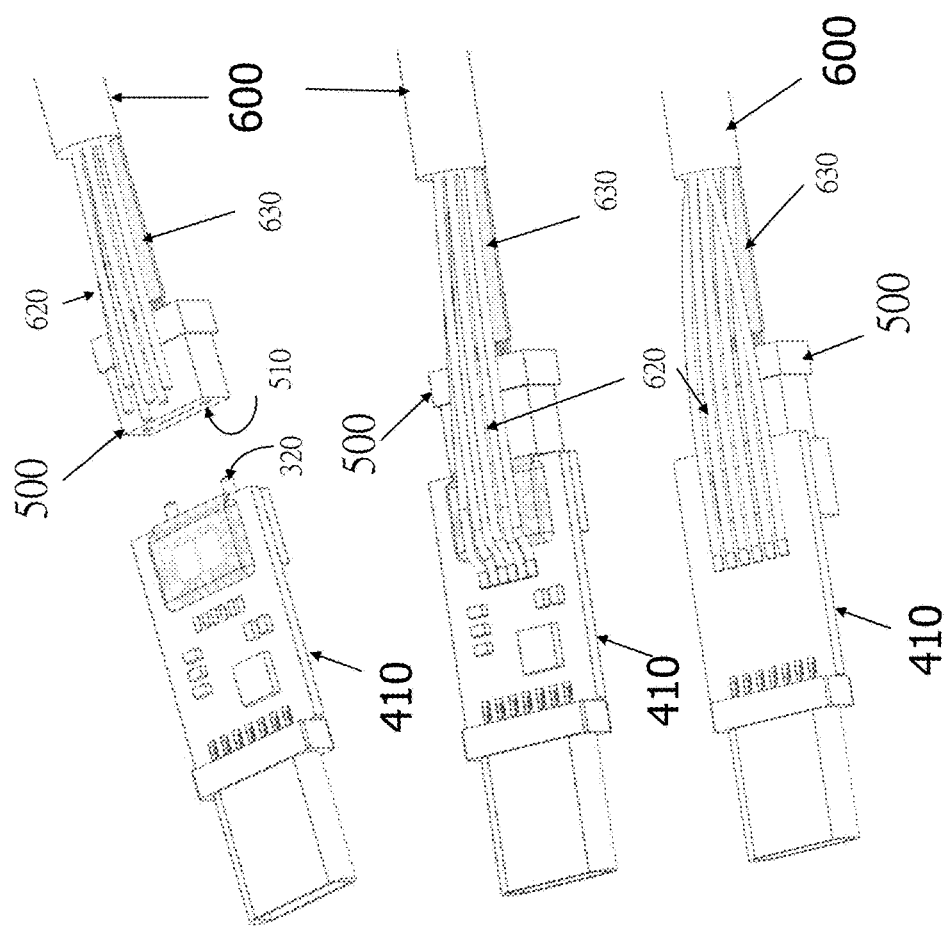
FIG. 7 illustrates a schematic perspective view showing an opto-electric cable coupled to OE module according to an embodiment of the invention.

Then, the OE module is coupled to an opto-electric cable to form a photoelectric conversion assembly. In the step 150, the OE module 410 is engaged with optical fibers 630 and electrical cable (wires) 620, shown in FIG. 7. In one embodiment, a photoelectric composite cable (hybrid cable) 600 is composed of the optical fibers 630 and electrical cable (wires) 620. The optical fibers 630 is used for transmitting optical (high speed) signals, and the electrical cable (wires) 620 is used to transmit electrical (low speed) signals or supply power source. The photoelectric conversion assembly further comprises an optical connector 500 for engaging with the optical bench 300 and the optical fibers 630.

The optical fibers 630 of the hybrid cable 600 may be inserted into the optical connector 500 for engaging with the OE module 410. The optical connector 500 is provided with guide holes 510 such that guide pins 320 of the OE bench 310 on the OE module 410 can be engaged into the guide holes 510. In addition, the electrical wires 620 of the hybrid cable 600 may be directly soldered on one side (bonding pads, top surface or bottom surface) of the OE module 410, or connecting to the OE module 410 by electrical connector. In another embodiment, it only uses optical fibers without electrical cable, and the optical connector 500 is engaged with the OE module 410.

In one embodiment, the optical fibers 630 is an optical ribbon fiber or bundle fiber. The optical ribbon fiber has optical fibers inserted into receiving holes, bores or grooves of the optical connector (ferrule) 500 for optically coupling to optical elements configured on the OE circuit board 210. The optical fibers are inserted into the optical connector 500 for coupling/connecting (engaging) to the photoelectric conversion module. The receiving holes or bores are generally cylindrical. For example, the optical fibers are multimode fibers or single mode fiber. The optical fibers aligned in series are included in the optical ribbon fiber 630. Each of the optical fibers has a core formed at a center thereof, a cladding surrounding the core, and a coating layer coated on an outer surface of the cladding in order to protect the core and the cladding, wherein reflective index (n) of the core is 1.35~1.70 and reflective index of the cladding is 1.35~1.70.

Finally, in the step 160, an injection molding process, for example a plastic injection molding process, is performed to encapsulate the OE module 410, shown in FIG. 9. The invention adopts low-pressure (1~60 bar), low temperature (<200 degree C.) injection molding process. Material of the injection molding can be plastic material. The formed appearance of the photoelectric conversion assembly can be simply plastic material 700, also can cover the shell 800 after forming the plastic material 700, in order to protect the OE module 410. Material of the shell 800 can be metal or plastic material.

For wire bonding example, the OE module 410 package (shown in FIG. 8) has some advantages than that of the conventional OE module package, and the encapsulated OE module of the invention has the features and advantages:
(1) the structure design of the invention includes a circuit board 200, located between the lens array 302 and LD/PD, which can: a). reduce flowing space by plastic material; b). protect lens array 302 from the plastic material.
(2) the optoelectronic chip and the wire bonding are protected by encapsulant, so they will not be damaged by the injection pressure in the injection molding process.
(3) the invention adopts low pressure (~60 bar), low temperature (<200 degree C.) injection molding, which can avoid the damage to the lens array due to high pressure and high temperature in the conventional injection molding.
(4) under low pressure, the protection structure (tape or protective cover) can effectively avoid plastic material into the mirror 308. (pressure difference between internal and external is small)

A size of the circuit board 200 is substantially equal to that of the platform region (configuration region) 301 of the optical bench 300.

Figure 8:
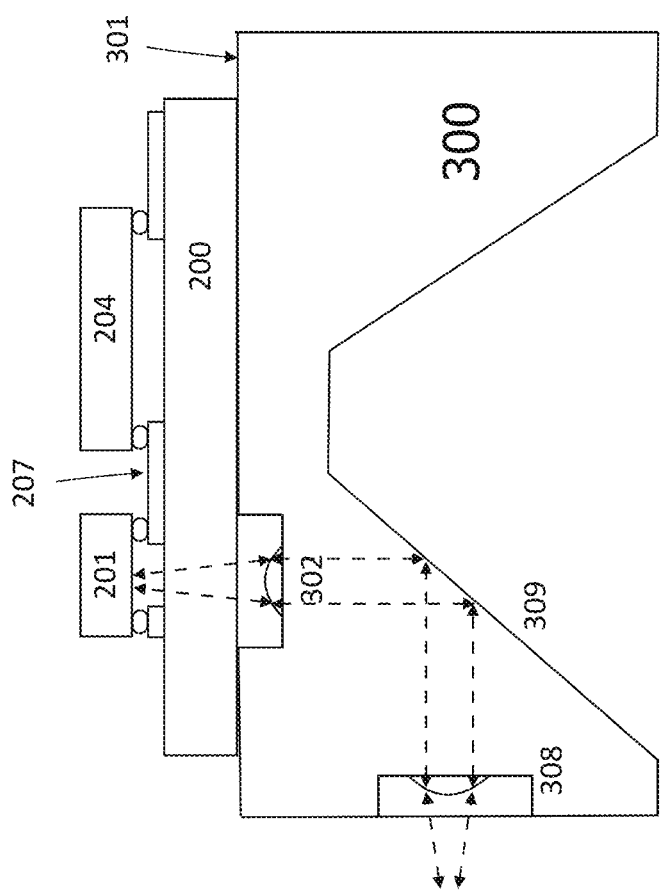
FIG. 8 illustrates a schematic perspective view showing photoelectric conversion module having circuit board and optical bench with double sides lens array according to an embodiment of the invention.

The photoelectric conversion module has the circuit board 200 and the optical bench 300 with double sides lens array 302 and 308, as shown in FIG. 8. In one embodiment, arrangement orientation of the lens array 302 is the same as the lens array 308. The optical bench 300 has a platform region (configuration region) 301 for the circuit board 200 configured/fixed thereon. In one embodiment, the lens array 302, 308 and a mirror 309 are embedded (integrated) into the optical bench 300. A mirror or reflector 309 is integrated into the optical bench 300. The mirror or reflector 309 is passively for optical signal generated by the light source chip 201 to be non-coplanar bending (optical reflection), and the optical signal is guided to an external optical transmission medium, such as optical fibers. Conversely, optical signals through the external optical transmission medium (optical fibers) are non-coplanar bending to guide the optical signals by the mirror 309, and received by the light receiving element 202. The mirror 309 can be fabricated to directly integrate into the optical bench 300 or the circuit board 200.

In one embodiment, the optical connector (ferrule) 500 includes a fiber connecting portion and an optical bench connecting portion for connecting the optical transmission member (optical fiber) and the optical bench, respectively. The optical connector (ferrule) 500 may be as a connection portion (joint) of the external optical transmission medium (optical fiber). The receiving holes, bores or grooves extend through from the front surface of the fiber connecting portion to the rear surface of the optical bench connecting portion. In one embodiment, the fiber connecting portion and the optical bench connecting portion may be integrally fabricated.

The rear ends of the plural optical fibers are fixed to an end of the optical bench connecting portion of the optical connector (ferrule) 500. The photoelectric conversion module has a function of converting an optical signal (via the plural optical fibers) from external electrical apparatus or equipment into an electrical signal, or transmitting an optical signal to the external electrical apparatus or equipment via the plural optical fibers.

In one embodiment, ICs are, for example a driver integrated circuit (IC), a control IC or a trans-impedance amplifier (TIA) chip, or others active components, configured on the circuit board. The driver IC may be used to drive the light source chip (such as optoelectronic device) for emitting light.

In one embodiment, the circuit board has an optical waveguide portion embedded therein for guiding light. Material and thickness of the optical waveguide portion may be selected, based-on requirements for practical applications. For example, material of the optical waveguide portion includes polymer material, dielectric material, such as polyimide. In one embodiment, the circuit board is a flexible substrate. The light source chip is capable of emitting visible and invisible light. The light source chip is for example a laser, infrared light or a light emitting diode (LED). Infrared light is in infrared band, which can be emitted by laser or LED.

The circuit board may be attached on the platform region (configuration region) of the optical bench by using an adhesive material, such as epoxy.

In one embodiment, the optical bench is combined with the circuit board having flexible waveguide (optical waveguide portion) for optical communication. Such structure may receive and transmit optical signal through the flexible waveguide. Light created by the light source chip may be reflected via the optical micro-reflection surface at one side of the flexible substrate.

As noted above, the flexible waveguide (optical waveguide portion) of the flexible substrate includes an under cladding layer, a core and an over cladding layer. Materials of the under cladding layer, the core and the over cladding layer are not specifically limited, and it is possible to used, e.g., an acrylic resin, an epoxy resin and a polyimide resin, etc.

The optical micro-reflection surface locates on optical path to extend between the light source chip (lens array) and the core for deflecting light by 90 degree.

The circuit board 200 is allowable for optical path penetrating therein, for facilitating light emitted from the light source chip 201 or coming from external devices passing through therein. In another embodiment, the circuit board 200 has a through hole passing through a top surface of the circuit board 200 to a bottom surface of the circuit board 200 allowable for optical path penetrating therein, for facilitating light emitted from the light source chip 201 or coming from external devices passing through therein. Conductive bumps (soldering bumps, metal bumps or Au bumps) are formed on the conductive trace 207 for coupling to the light source chip 201 or the light receiving element 202, the ICs 203 and 204.

The conductive trace on the circuit board may be electrically connected to ICs or the circuit board by wire bond or flip board for signal connection.

The advantages of the invention include:
(1) OE circuit board has the metal trace, also provided with a sheet of metal region arranged around the chips to quickly dissipating the heat generated by the chips away from the area of the chips; the metal region may be designed as different graph to become more effective heat dissipation mechanism.
(2) a number of perforations (via holes) may be created on the OE circuit board. The via holes located under light source chip or the light receiving element, to be as channel for optical signal, and therefore optical signal can propagate through the circuit board. However, whether the via holes of optical signal channel is fabricated or not depends on the wavelength of optical signal and the material of the circuit board. The other via holes are to provide for detection.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for manufacturing an active optical cable, comprising:
   flip-chip packaging a chip on a circuit board to form an optoelectronic circuit board;
   attaching said optoelectronic circuit board on a relative higher partial top surface of an optical bench to form an optoelectronic bench, wherein said optical bench is fabricated by an injection molding process;
   aligning an opening of a printed circuit board to said optoelectronic circuit board of said optoelectronic bench, attaching a relative lower partial top surface of said optical bench of said optoelectronic bench on a front end of said printed circuit board and electrically coupling a metal trace of said optoelectronic circuit board to circuits of said printed circuit board to form an optoelectronic module;
   encapsulating said optoelectronic bench by an encapsulant to cover said optoelectronic circuit board;
   engaging optical fibers or an opto-electric cable with said optoelectronic module to form a photoelectric conversion assembly; and
   performing a low pressure and low temperature injection molding process to form said active optical cable, wherein said low pressure is 1 to 60 bar and said low temperature is smaller than 200 degree C.

2. The method of claim 1, wherein said photoelectric module comprises:
   said circuit board having a conductive trace formed on said circuit board;
   at least one optical element flip-chip configuring on said circuit board to couple to said conductive trace of said circuit board; and
   wherein said optical bench includes at least one lens array and a mirror, wherein one of said at least one lens array is configured to align said at least one optical element.

3. The method of claim 2, wherein said at least one optical element is a light source chip, a photo diode chip, a photo detector chip or a photosensitive chip.

4. The method of claim 1, wherein said opto-electric cable is composed of optical fibers and electrical wires, wherein said optical fibers are coupled to said optoelectronic module and said electrical wires are coupled to said printed circuit board.

5. The method of claim 4, further comprising providing an optical connector to engage with said optical bench and said optical fibers, and a guide pin for engaging said optical connector and said optical bench.

6. The method of claim 1, wherein said optoelectronic bench is coupled to said printed circuit board by wire bonding.

7. The method of claim 1, wherein said optoelectronic bench is coupled to said printed circuit board by wire bonding, wherein said wire bonding is covered by said encapsulant.

8. The method of claim 1, further comprising configuring at least one IC on said circuit board.

9. The method of claim 1, wherein said circuit board has at least one through hole passing through a top surface to a bottom surface of said circuit board for aligning an alignment mark on said optical bench.

10. The method of claim 1, wherein said printed circuit board has at least one through hole passing through a top surface to a bottom surface of said printed circuit board for aligning an alignment mark on said optical bench.

11. The method of claim 1, further comprising said chip on said optoelectronic circuit board facing to said opening of said printed circuit board, and said metal trace of said optoelectronic circuit board directly metal pressing to said circuits of said printed circuit board to form said optoelectronic module.

12. The method of claim 11, wherein said photoelectric module comprises:
   said circuit board having conductive trace formed on said circuit board;
   at least one optical element flip-chip configuring on said circuit board to couple to said conductive trace of said circuit board; and
   wherein said optical bench includes at least one lens array and a mirror, wherein one of said at least one lens array is configured to align said at least one optical element.

13. The method of claim 12, wherein said at least one optical element is a light source chip, a photo diode chip, a photo detector chip or a photosensitive chip.

14. The method of claim 11, wherein said opto-electric cable is composed of optical fibers and electrical wires, wherein said optical fibers are coupled to said optoelectronic module and said electrical wires are coupled to said printed circuit board.

15. The method of claim 14, further comprising providing an optical connector to engage with said optical bench and said optical fibers, and a guide pin for engaging said optical connector and said optical bench.

16. The method of claim 11, wherein material of said circuit board comprises silicon, silica, ceramic, or dielectric material.

17. The method of claim 11, wherein material of said circuit board is a flexible print circuit (FPC).

18. The method of claim 11, further comprising configuring at least one IC on said circuit board.

19. The method of claim 11, wherein said circuit board has at least one through hole passing through a top surface to a bottom surface of said circuit board for aligning to alignment mark on said optical bench.

20. The method of claim 11, wherein said printed circuit board has at least one through hole passing through a top surface to a bottom surface of said printed circuit board for aligning to alignment mark on said optical bench.

* * * * *